2,001,926

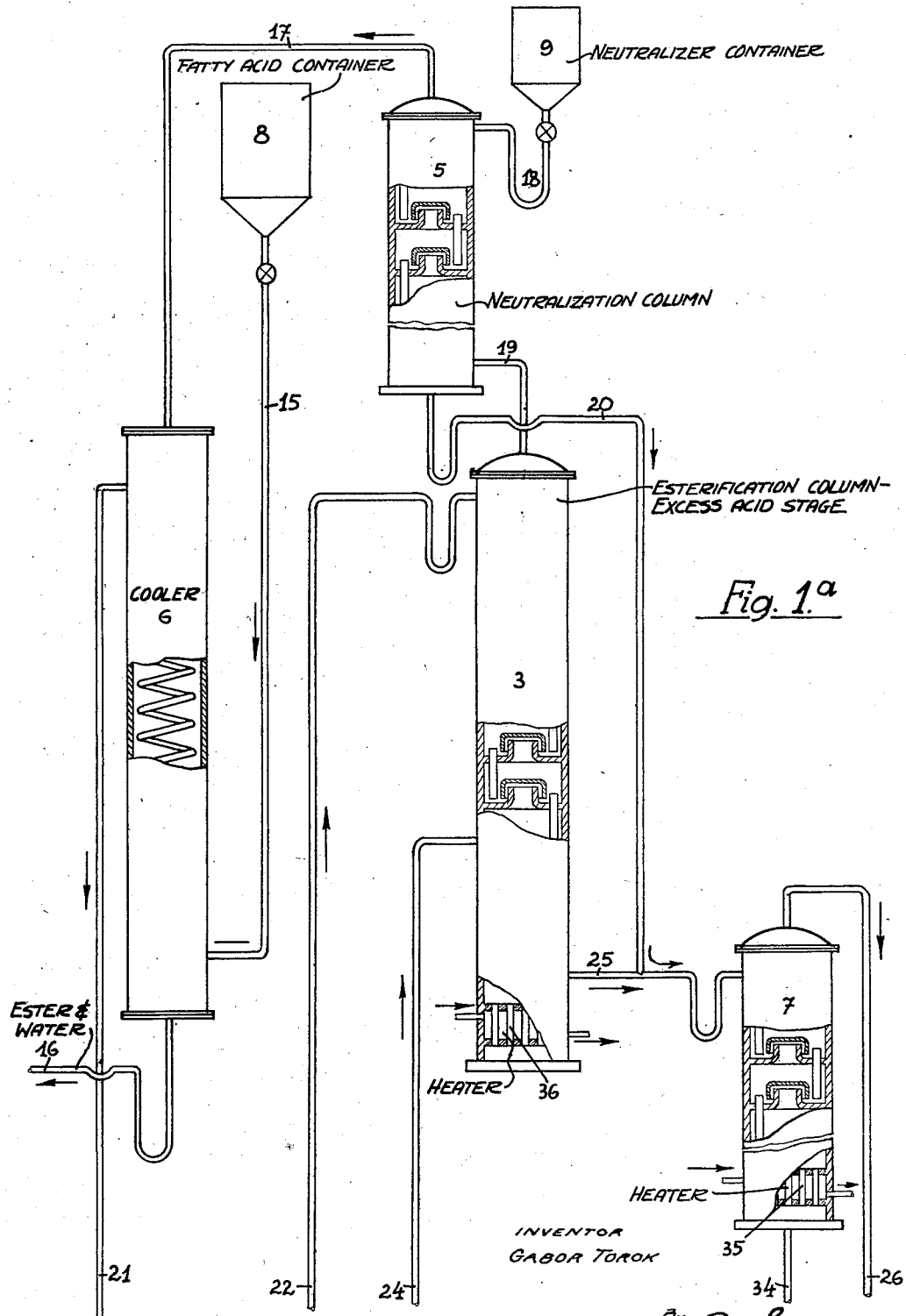

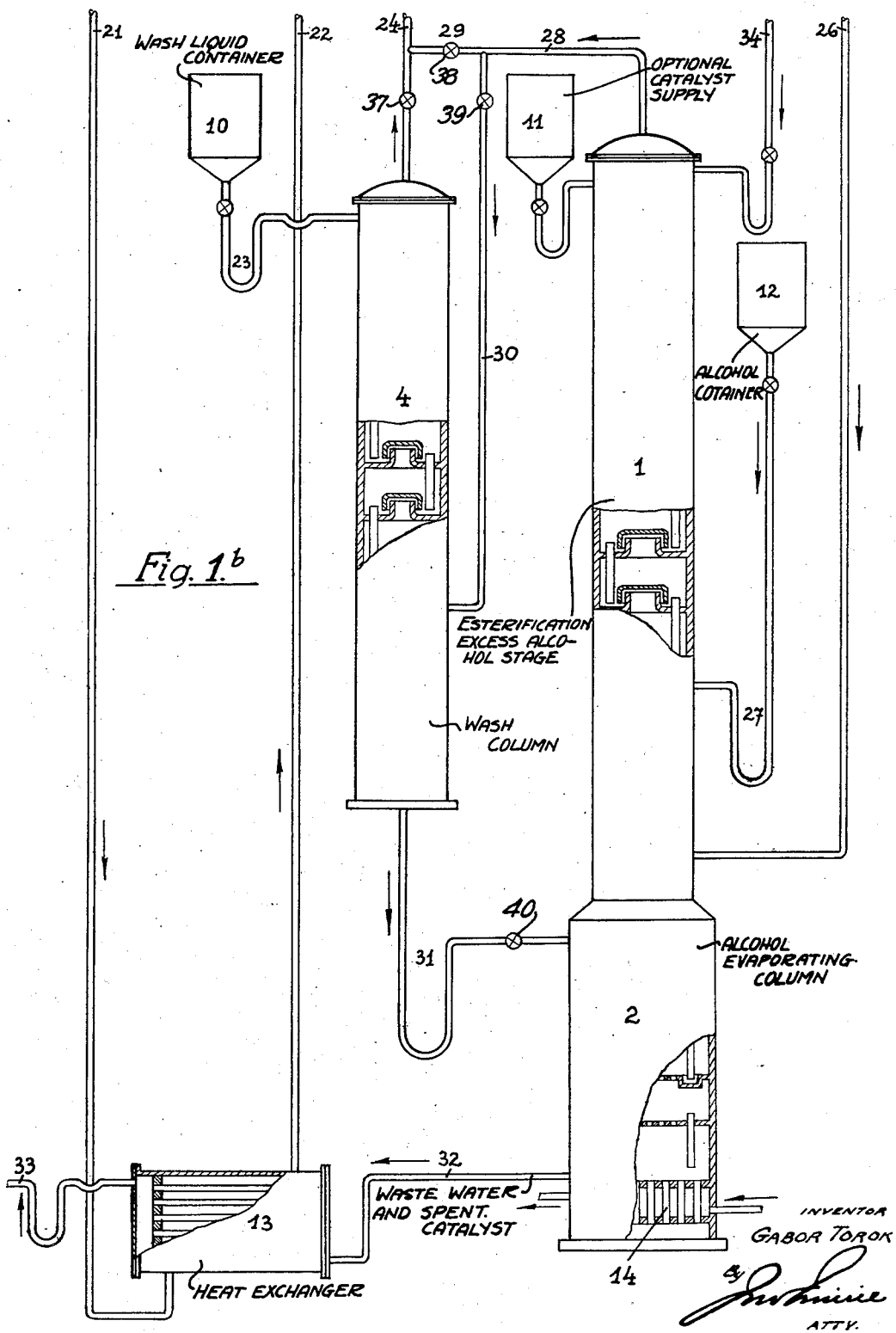
May 21, 1935.  G. TÖRÖK  2,001,926
ESTERIFICATION OF ORGANIC ACIDS WITH SEPARATION
OF THE ESTERS IN HIGHLY CONCENTRATED FORM
Filed June 9, 1932   2 Sheets-Sheet 2
Fig. 1.b Patented May 21, 1935

UNITED STATES PATENT OFFICE 2,001,926

ESTERIFICATION OF ORGANIC ACIDS WITH SEPARATION OF THE ESTERS IN HIGHLY CONCENTRATED FORM

Gábor Török, Budapest, Hungary

Application June 9, 1932, Serial No. 616,314
In Germany June 13, 1931

5 Claims. (Cl. 260—106)

This invention relates to a process for the esterification of organic acids with separation of the esters in highly concentrated form.

In the direct esterification of aqueous organic acids, as it is known, the alcohol is used in large excess. The separation of the alcohol-ester mixture thereby produced, with the production of highly concentrated esters, is, even in the case of the low boiling alcohols, only possible with some difficulty, in the case of working up higher boiling alcohols which are only slightly soluble in water such as butyl or amyl alcohol however only a very incomplete separation can be effected.

The present process has for its object the direct conversion of aqueous organic acids into esters with the production of highly concentrated products also including the case of working up higher and more difficultly water-soluble alcohols. In this process the boiling point of the alcohol employed at any time, and of the ester prepared therefrom must not attain to 100° C.; or, if alcohols boiling above 100° C., such as butyl alcohol, are employed, the boiling point of the binary or ternary mixtures formed from such an alcohol and the corresponding ester or from either or both with water must not attain to 100° C.

In the process according to the invention the esterification is carried out in two consecutive working stages which are effected in conjunction with one another but which take place separately, the working conditions being selected so that in one phase the process is carried out with an excess of alcohol ("excess alcohol stage") but in the other there is an excess of acid ("excess acid stage"). The unconsumed acid from the excess acid stage is passed to the excess alcohol stage where it is esterified practically without residue. The portion of the excess alcohol thereby unconsumed is passed with the ester produced into the excess acid stage and there likewise esterified practically without residue. This method of working allows of the application of an excess of alcohol also including the case of the esterification of the above-mentioned higher boiling difficultly water-soluble alcohols and gives in good yields esters practically free from alcohol which could hitherto be separated from the alcohols concerned not at all by distillation and only very incompletely by washing.

In the excess alcohol stage, in the known manner, the dilute organic acid (for example fermentation acetic acid) flows with the application of sulphuric acid or the like through a column from top to bottom and is thereby esterified practically without residue by the alcohol vapours rising from the bottom in excess. The vapour mixture of alcohol-ester-water passing out at the head of the column then passes to the excess acid stage; it is allowed to rise in a second column against the downwardly moving dilute organic acid. By this means the alcohol contained in the rising vapors is esterified practically without residue by the acid which is here passed in in excess. The binary vapor mixture passing out from the head of this column consisting essentially only of ester and water now finally leaves the system and can be condensed either immediately or after traversing a small neutralization column which is charged with warm dilute sodium carbonate or alkali metal acetate solution or the like. The portion of excess acid collecting in the lower part of the column is employed for the supply of the column working with excess of alcohol and so on.

When water soluble alcohols are esterified then the excess of alcohol in the excess alcohol stage can be selected of any suitable amount if care is taken that any too great excess of alcohol is reduced prior to entry into the excess acid stage. This can be attained for example by the insertion of an intermediate column fed with warm water. By controlled passage of the vapors containing ester and excess of alcohol through this intermediate column with a downward flow of warm water, without difficulty a vapor mixture can be obtained with alcohol content reduced to any desired extent or with an ester content of any desired value (up to about 60–90%). The quantity and temperature of the wash water is in this connection regulated so that the temperature of the water-alcohol solution produced on the one hand remains below its own boiling point and on the other hand however exceeds the boiling point of the ester or of the binary ester-water or ternary ester-water-alcohol mixture. The vapor mixture leaving the intermediate column is now passed into the excess acid stage, the aqueous alcohol flowing downwards is however returned into the excess alcohol phase.

As wash liquid for the intermediate column instead of water any suitable dilute salt solution can be employed or also the dilute acid to be esterified itself; in the latter case from the wash liquid flowing down the alcohol is driven off and the alcohol passed to the esterification In the working up of difficulty water soluble alcohols this intermediate column is dispensed with. The excess of alcohol should not exceed 100%. The ester-alcohol-water vapor mixture passing out of the column of the excess alcohol stage is passed immediately into the column of the excess acid stage where the preponderating portion of the entrained alcohol is likewise esterified.

As catalysts are employed the hitherto used mineral acids, active column-filling materials of large surface or both.

The drawings illustrate diagrammatically an embodiment of the apparatus to be used for carrying out the process. The drawings will be explained with reference to the following examples:—

Example 1

From the container 12 (Fig. 1b) through the tube 27 methyl alcohol of about 95% is passed into the column 1 with simultaneous switching on of the heating devices 14, 35 and 36 (Fig. 1a). The vapors of the methyl alcohol pass through an ordinary dephlegmator, not shown, and through the tubes 28 and 30 with the valve 38 closed and the valve 39 open into the wash column 4 to which from the container 10 through the tube 23 is led warm water at a temperature of about 40–50° C. The methyl alcohol vapors are condensed or dissolved by the warm water and the aqueous solution is passed through the tube 31 and the open valve 40 into the alcohol evaporator 2 where the alcohol is again vaporised. The quantity of methyl alcohol, maintained in circulation in this manner and later constituting the permanent excess, which traverses the cross section of the column per unit time amounts to about four times that quantity of methyl alcohol which is the equivalent to the quantity of acid to be introduced into the column per unit time. As soon as this quantity is attained there commences the controlled supply of the "acid" from the container 8. This acid is a 30–40% acetic acid which is already mixed with sulphuric acid in such a proportion that the acid mixture contains for 1 kg. of absolute acetic acid about 0.25–0.75 kg. of sulphuric acid of 50° Bé. At the same time as the beginning of the supply of acid the cock of the methyl alcohol container 12 is adjusted so that the quantity of methyl alcohol flowing into the column 1 per unit time is about 1.2–1.3 times that quantity of methyl alcohol which is equivalent to the absolute acetic acid content of the dilute acetic acid introduced into the system per unit time. The acid mixture passing out of the container 8 flows consecutively through the jacket of the cooler 6, through the tube 21, to the heat exchanger 13, through the tube 22 to the column 3 and through the tube 25 to the column 7 and attains by the tube 34 to the upper portion of the esterification column 1 at a temperature which is higher than the boiling point of the methyl acetate. While the acid mixture flows downwards its acid content is converted into methyl acetate which with the excess of methyl alcohol in the vapor form leaves the column 1 through the dephlegmator and the tube 28. The dilute sulphuric acid already free from acetic acid passing to the alcohol evaporator 2 is here freed from alcohol and leaves the system through the tube 32, heat exchanger 13 and tube 33. The ester-alcohol vapor mixture passes through the tube 28 into the wash column 4. By means of the warm water supplied from the container 10 the desired portion of the excess of alcohol is washed out of the vapor mixture, the aqueous alcohol is passed back through the tube 31 into the alcohol evaporator 2 where as the vapor mixture consisting of methyl acetate and the residual methyl alcohol passes through the tube 24 into the esterification column 3 where the methyl alcohol is likewise converted into ester by the excess of acid flowing from top to bottom. The acid mixture containing some alcohol collecting in the lower portion of the column 3 passes through the tube 25 into the column 7 and from here the alcohol is conducted through a dephlegmator not shown and through tube 26 into the lower part of the column 1 while the acid passes through the tube 34 into the upper part thereof. The methyl acetate vapors entraining some free acid passing out at the head of the column 3 through a dephlegmator likewise not shown and through the tube 19 are washed in the neutralisation column 5 with 1 to 2% warm potassium acetate solution from the container 9, pass through a fourth dephlegmator not shown and through the tube 17, are condensed in the cooler 6 and recovered at 16. The sulphuric acid can also flow immediately from the container 11 into the column 1 in which case from the container 8 only the dilute acetic acid is supplied.

Example 2

The container 8 contains a mixture of 10% acetic acid and sulphuric acid, about 10–30 kg. of sulphuric acid of 50° Bé. being calculated per 100 kg. of 10% acetic acid. The container 12 contains 96% ethyl alcohol. The quantity of the excess of alcohol maintained in circulation amounts to about 6–8 times, and the quantity continuously added about 1.1 to 1.3 times the calculated equivalent quantity. The temperature of the wash water for the intermediate column 4 and also that of the dilute potassium acetate solution for the neutralization column 5 is maintained at about 75–80° C. Otherwise the course of the process corresponds exactly to that according to Example 1.

Example 3

The container 8 is filled with a mixture of 10% acetic acid and sulphuric acid as in Example 2. The container 12 contains 98% n-butyl alcohol which forms in the column system at 92° C. a binary vapor mixture of 57% butyl alcohol and 43% water. The excess of butyl alcohol is not retained in circulation but instead per unit time so much butyl alcohol is introduced into the column 1 as amounts to about 1.5 to twice that quantity of butyl alcohol which is equivalent to the acetic acid supplied to column 1 per unit time. The vapor mixture of butyl acetate-butyl alcohol-water passing out at the head of the column 1 at a temperature of 89–92° C. passes through the dephlegmator not shown and the tubes 28, 29, 24 immediately into the esterification column 3, where, under the action of the acetic acid which is there present in excess, the preponderating portion of its butyl alcohol content is likewise converted into butyl acetate, so that the product obtained at 16 after separation of the entrained water constitutes an 85–90% butyl acetate. In this case also the sulphuric acid can be supplied to the column 1 directly from the container 11.

The foregoing examples relate to acetic acid, the esters of which are the most important in industry. The process is however not limited to the application of acetic acid, in the same manner other organic acids can be esterified.

Various changes may be made in the details described in the foregoing specification without departing from the invention or sacrificing the advantages thereof.

I claim:—

1. A process for the direct conversion of water-soluble lower fatty acids with monohydric aliphatic alcohols into highly concentrated esters which are practically free from alcohols, in which the esterification of the aqueous lower fatty acid is effected in two consecutive, conjoint, but separately proceeding working stages, in the first stage with an excess of alcohol and in the second stage with an excess of acid, practically completely esterifying the said fatty acid by subjecting the liquid acid coming from the excess acid stage to the action of excessive quantities of alcohol vapors led in counter-current to it, and practically completely removing any alcohol vapors from the ester by subjecting the ester vapors resulting from the excess alcohol stage to the action of an excess of unreacted liquid lower fatty acid led in counter-current to them.

2. A process for the direct conversion of water-soluble lower fatty acids with monohydric aliphatic alcohols into highly concentrated esters which are practically free from alcohols, in which the esterification is effected in two consecutive, conjoint, but separately proceeding working stages, in such a manner that in the first stage the aqueous fatty acid is esterified in the presence of a mineral acid as a catalyst, by passing downwards through a column in which rise vapors of the alcohol in excess, then as a second stage the vapor-mixture of alcohol-ester-water passing out at the head of the column is allowed to rise in a second column in the presence of a mineral acid acting as a catalyst against downwardly moving aqueous fatty acid in excess, for practically complete esterification of the alcohol contained in the rising vapors, and finally the vapor-mixture consisting practically only of ester and water leaves the system and the ester is separated.

3. In a process as claimed in claim 2 removing a portion of the excess alcohol contained in the vapor-mixture leaving the excess alcohol stage prior to entry into the excess acid stage.

4. In a process as claimed in claim 2 removing a portion of the excess alcohol contained in the vapor-mixture leaving the excess alcohol stage prior to entry into the excess acid stage by washing with warm water at a temperature which exceeds the boiling point of the binary vapor-mixture of ester-water and of the ternary vapor-mixture of ester-water-alcohol formed but does not attain the boiling point of the alcohol-water solution formed.

5. In a process as claimed in claim 2 removing a portion of the excess alcohol contained in the vapor-mixture leaving the excess alcohol stage prior to entry into the excess acid stage by washing with a dilute solution of the acid to be esterified, distilling off the alcohol from the wash liquid obtained, and returning the alcohol distilled off and the residual dilute and each one separately to the esterification process.

GÁBOR TÖRÖK.